United States Patent [19]

Maresh

[11] Patent Number: 5,236,025
[45] Date of Patent: Aug. 17, 1993

[54] DIAGONAL TIRE CHAINS WITH SIDE CABLE FASTENERS

[75] Inventor: Joseph D. Maresh, Dundee, Oreg.
[73] Assignee: Burns Bros., Inc., Portland, Oreg.
[21] Appl. No.: 729,225
[22] Filed: Jul. 12, 1991

Related U.S. Application Data

[60] Division of Ser. No. 439,802, Nov. 21, 1989, Pat. No. 5,056,574, which is a continuation-in-part of Ser. No. 363,142, Jun. 8, 1989, abandoned.

[51] Int. Cl.$^5$ .......................................... B60C 27/10
[52] U.S. Cl. .................................. 152/219; 152/221; 152/241; 152/244
[58] Field of Search .................. 152/219, 213 A, 221, 152/231, 241, 242, 239, 243, 223, 225, 213 R, 217, 218, 244

[56] References Cited

U.S. PATENT DOCUMENTS

| | | |
|---|---|---|
| 793,618 | 6/1905 | Smith . |
| 870,656 | 11/1907 | Woodworth . |
| 953,645 | 3/1910 | Story et al. . |
| 1,342,753 | 6/1920 | McGeorge . |
| 1,346,226 | 7/1920 | Mager ........................ 152/222 |
| 1,387,429 | 8/1921 | Montgomery . |
| 1,486,993 | 3/1924 | Stolpe . |
| 1,493,878 | 5/1924 | Hanson . |
| 1,628,019 | 5/1927 | Wilson . |
| 1,687,407 | 10/1928 | Wagner . |
| 2,192,227 | 3/1940 | Hill ............................. 152/242 |
| 2,252,778 | 8/1941 | Morss .......................... 152/213 |
| 2,290,398 | 7/1942 | Wellington ................. 152/226 |
| 2,310,807 | 2/1943 | Pool ............................ 152/216 |
| 2,540,230 | 2/1951 | Andrews ..................... 152/218 |
| 3,752,204 | 8/1973 | Ouellette .................... 152/219 |
| 3,842,881 | 10/1974 | Muller et al. ............... 152/213 A |
| 3,939,891 | 2/1976 | Barnett et al. .............. 152/225 R |
| 3,996,984 | 12/1976 | Mezzacapo ................. 152/225 R |
| 4,055,210 | 10/1977 | Mongault .................... 152/239 |
| 4,071,069 | 1/1978 | Raspet et al. ............... 152/213 A |
| 4,266,593 | 5/1981 | Hayashi ...................... 152/218 |
| 4,280,545 | 7/1981 | Martinelli ................... 152/222 |
| 4,366,849 | 1/1983 | Martinelli ................... 152/243 |
| 4,366,850 | 1/1983 | Coutts ........................ 152/222 |
| 4,392,521 | 7/1983 | Giannone ................... 152/218 |
| 4,542,779 | 9/1985 | Müller et al. ............... 152/213 A |
| 4,615,364 | 10/1986 | Nestlen ....................... 152/219 |
| 4,615,368 | 10/1986 | Nestlen ....................... 152/213 A |
| 4,648,434 | 3/1987 | Melzi et al. ................. 152/217 |
| 4,665,589 | 5/1987 | Gregccutti .................. 152/213 |
| 4,679,608 | 7/1987 | Jeindl ......................... 152/213 A |
| 4,749,015 | 6/1988 | Miyagawa ................... 152/213 A |
| 4,825,923 | 5/1989 | Blankenship et al. ...... 152/219 |

FOREIGN PATENT DOCUMENTS

| | | |
|---|---|---|
| 0248387 | 12/1987 | European Pat. Off. . |
| 2654241 | 6/1977 | Fed. Rep. of Germany ... 152/213 A |
| 2844516 | 4/1980 | Fed. Rep. of Germany . |
| 2387808 | 12/1978 | France ........................ 152/221 |
| 2545045 | 11/1984 | France ........................ 152/241 |
| 4812886 | 4/1973 | Japan . |
| 0122808 | 6/1987 | Japan ......................... 152/221 |
| 0187605 | 8/1987 | Japan ......................... 152/231 |
| 0038011 | 2/1988 | Japan ......................... 152/241 |

OTHER PUBLICATIONS

Whitestar brochure pp. 29–36.
Advertising brochure relating to Korean Utility Model No. 30777.

Primary Examiner—Michael W. Ball
Assistant Examiner—Nancy T. Krawczyk
Attorney, Agent, or Firm—Shapiro and Shapiro

[57] ABSTRACT

A tire chain comprises an elongated inner side member adapted to form a circle of predetermined circumference about a rim of a vehicle wheel at the inner side thereof, the inner side member having co-operable fastener elements at opposite ends thereof which are joined to complete the circle. Cross members form a zig-zag pattern with opposite ends of the pattern adjacent to the fastener elements, respectively. The pattern includes a plurality of spaced inner vertices adjacent to the inner side member and a plurality of spaced outer vertices remote from the inner side member and adapted to be positioned adjacent to the rim at the outer side thereof, with the cross members extending back and forth across the tread of a tire mounted on the rim. The inner vertices are attached to the inner side member at predetermined positions by connectors intermediate the vertices and the inner side member. The outer vertices are provided with connectors to which a tensioning device is coupled for drawing the outer vertices toward the rotational axis of the wheel. While the spacing of the inner vertices is essentially fixed, the spacing of adjacent outer vertices is adjustable.

4 Claims, 10 Drawing Sheets

DIAGONAL TIRE CHAINS WITH SIDE CABLE FASTENERS

This is a division of application Ser. No. 439,802 filed Nov. 21, 1989, now U.S. Pat. No. 5,056,574, which is a continuation-in-part of application Ser. No. 363,142 filed Jun. 8, 1989, now abandoned.

This invention relates to tire chains intended to provide traction for automotive vehicles, such as cars and trucks, driven on snow or ice, for example. More particularly, the invention is concerned with tire chains having so-called diagonal cross members, and especially with tire chains in which at least the cross members comprise flexible cables that support traction elements.

BACKGROUND OF THE INVENTION

The prior art is replete with wheel-mountable auxiliary or emergency traction devices for automotive vehicles, including devices in which at least the cross members (i.e., the members crossing the tread of a vehicle tire) are formed of link chain or of flexible cables supporting traction elements. Also known in the prior art, but less widely used, are wheel-mountable auxiliary or emergency traction devices in which road-engaging components are formed of a network of rods, bars, or similar elements integrated into a pattern of traction elements extending more or less continuously over the tread of the tire. Despite the proliferation of prior art devices, a need has remained for the development of traction devices that are improved in terms of performance, ease of mounting and demounting, adjustability, longevity, versatility (to accommodate different tire sizes), and other characteristics that will be discussed in greater detail.

BRIEF DESCRIPTION OF THE INVENTION

In accordance with one of the broader aspects of the invention, a tire chain comprises an elongated inner side member adapted to form a circle of predetermined circumference about a rim of a vehicle wheel at the inner side thereof. The inner side member has cooperable fastener elements at opposite ends thereof which are joined to complete the circle. The tire chain also comprises a plurality of cross members forming a diagonal pattern with opposite ends of the pattern adjacent to respective fastener elements of the inner side member. The pattern includes a plurality of inner vertices adjacent to and spaced along the inner side member and a plurality of outer vertices remote from the inner side member and adapted to be positioned at spaced locations adjacent to the rim at the outer side thereof, with the cross members extending across the tread of a tire mounted on the rim. The inner vertices have means for attaching them to the inner side member at predetermined positions. The tire chain also comprises tensioning means for drawing the outer vertices toward the rotational axis of the wheel and for providing adjustable spacing between successive outer vertices.

In a first embodiment of the invention, the tensioning means comprises a plurality of cable segments adapted to be connected seriatim to form an outer side member. Each cable segment has one end anchored to a connector at an outer vertex, is slidably coupled to a connector at a succeeding outer vertex, and has a free end that is releasably fastened to a connector at a next succeeding outer vertex in a manner that permits adjustment of the effective length of the cable segment. The releasably fastened end of each cable segment is associated with the same outer vertex connector as the anchored end of a succeeding cable segment.

In a second embodiment of the invention, the tensioning means comprises link chain segments adapted to be connected seriatim to form an outer side member. In a third embodiment of the invention, the tensioning means comprises an elastic member. In a fourth embodiment of the invention, the tensioning means comprises an adjustable length of webbing.

BRIEF DESCRIPTION OF THE DRAWINGS

The invention will be further described in conjunction with the accompanying drawings, which illustrate preferred (best mode) and exemplary embodiments, and wherein.

DETAILED DESCRIPTION OF THE INVENTION

Figure 1:
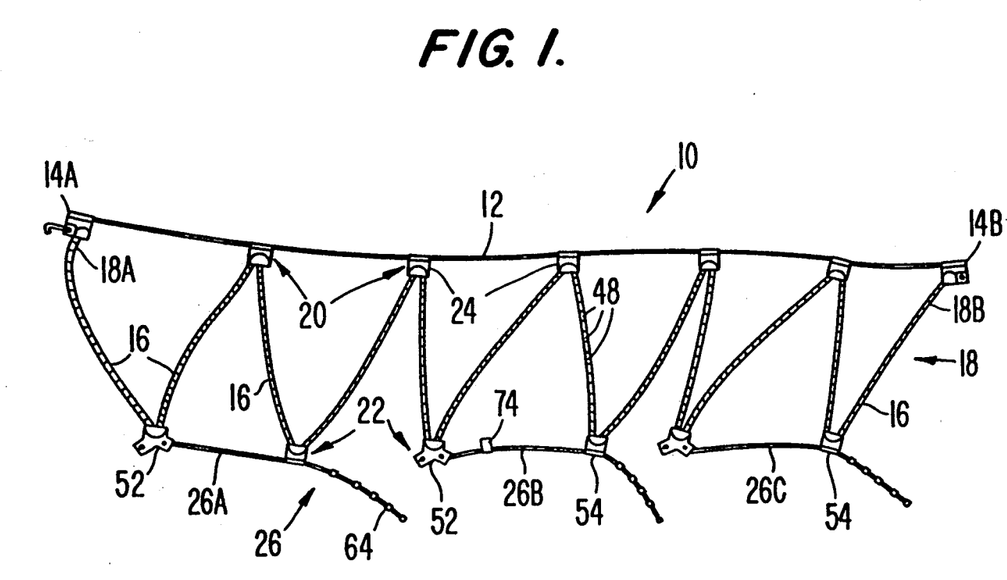
FIG. 1 is a plan view of a tire chain in accordance with a first embodiment of the invention.

As shown in FIG. 1, a tire chain 10 in accordance with a first embodiment of the invention comprises an elongated inner side member 12 having cooperable fastener elements 14A, 14B at opposite ends thereof, and a plurality of cross members 16 forming a zig-zag diagonal pattern 18 with opposite ends 18A, 18B of the pattern adjacent to respective fastener elements of the inner side member. The pattern includes a plurality of inner vertices 20 adjacent to and spaced along the inner side member and a plurality of outer vertices 22 remote from the inner side member. The inner vertices have connectors 24 for attaching them to the inner side member at predetermined positions. The tire chain also comprises a tensioning device 26 for drawing the outer vertices toward the rotational axis of a wheel and for providing adjustable spacing between adjacent outer vertices.

Figure 2:
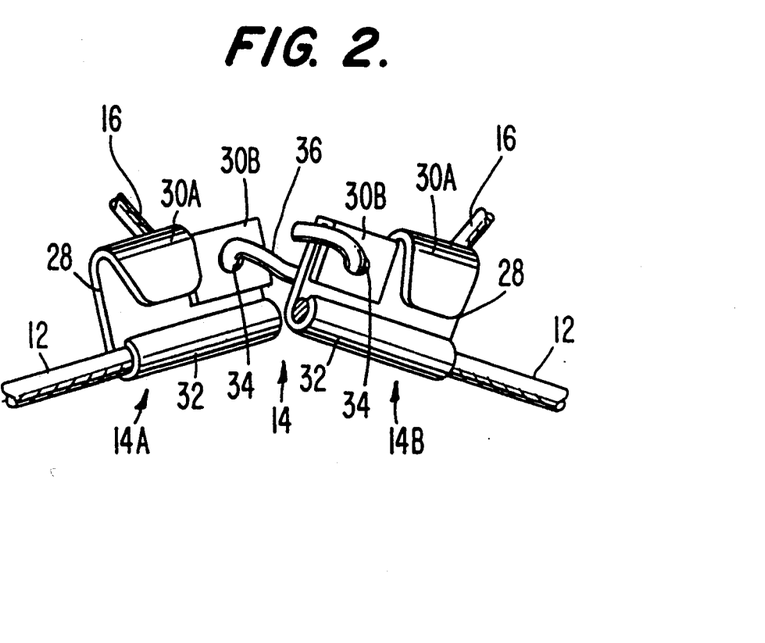
FIG. 2 is a fragmentary perspective view showing an inner side cable fastener that may be employed in the invention.

In the form shown, the inner side member is a flexible cable of a type commonly employed in cable-type tire chains. The fastener elements are adapted to be joined to each other to form fastener 14, as shown in FIG. 2, and may comprise plates 28 having bent over tabs 30A, 30B and sleeves 32. The sleeves are preferably crimped to the respective ends of the inner side cable. The tabs 30B and the underlying plates have holes 34 for receiving a hook 36 as shown. The cross members 16 at the end of the pattern are attached to the plates in a manner to be described later, and when the fastener elements are joined by hook 36 as shown in FIG. 2, those cross members converge toward the fastener elements, as is evident in FIG. 2. The inner side member is adapted to form a circle of predetermined circumference about a rim of a vehicle wheel at the inner side thereof. The circle is completed by joining the fastener elements as shown in FIG. 2.

Figure 3:
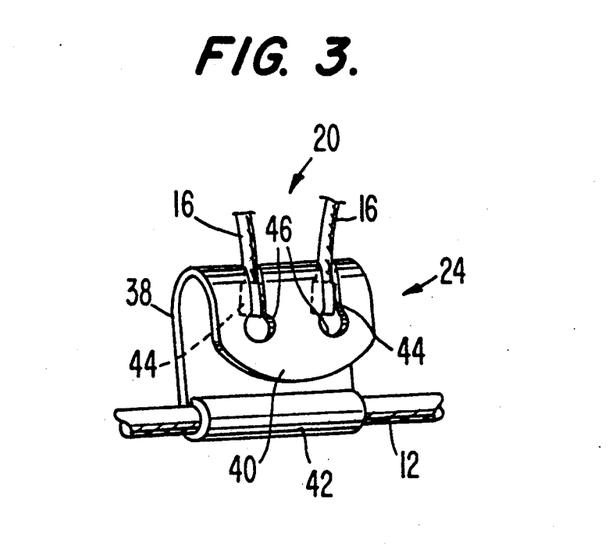
FIG. 3 is a fragmentary perspective view showing a connector that may be used to connect cross members to an inner side cable.

One of the connectors 24 for attaching an inner vertex to the inner side cable is shown in FIG. 3 and comprises a plate 38 having a bent over tab 40 and a sleeve 42. The sleeve is preferably crimped to the inner side cable 12. Ends of a pair of successive cross members 16 forming an inner vertex 20 are attached to the connector 24, so that the connector is intermediate the vertex and the inner side cable, as shown. FIG. 3 illustrates one of the ways in which the cross members may be attached to the connector. In this embodiment, a bushing or lug 44 is crimped to the end of each cross cable; the lugs are passed through keyhole-shaped openings 46 in the tab (and/or plate); and then the tab is bent over (to the position shown in FIG. 3) to trap the lugs between the tab and the plate. U.S. Pat. No. 4,366,850 assigned to the assignee of the present invention discloses a similar arrangement for connecting a cross member to a side member. By virtue of the arrangement shown in FIG. 3, the cross members are capable of hinging movement relative to the connector, so that the vertex angle between the cross members is adjustable. Also, a cross member may readily be replaced by unbending a tab to remove a cross member and insert a new one and then rebending the tab.

Each cross member at an end of the zig-zag pattern may be attached to an associated plate 28 in FIG. 2 in the same manner that each of the cross members shown in FIG. 3 is attached to the plate in that figure.

Figure 4:
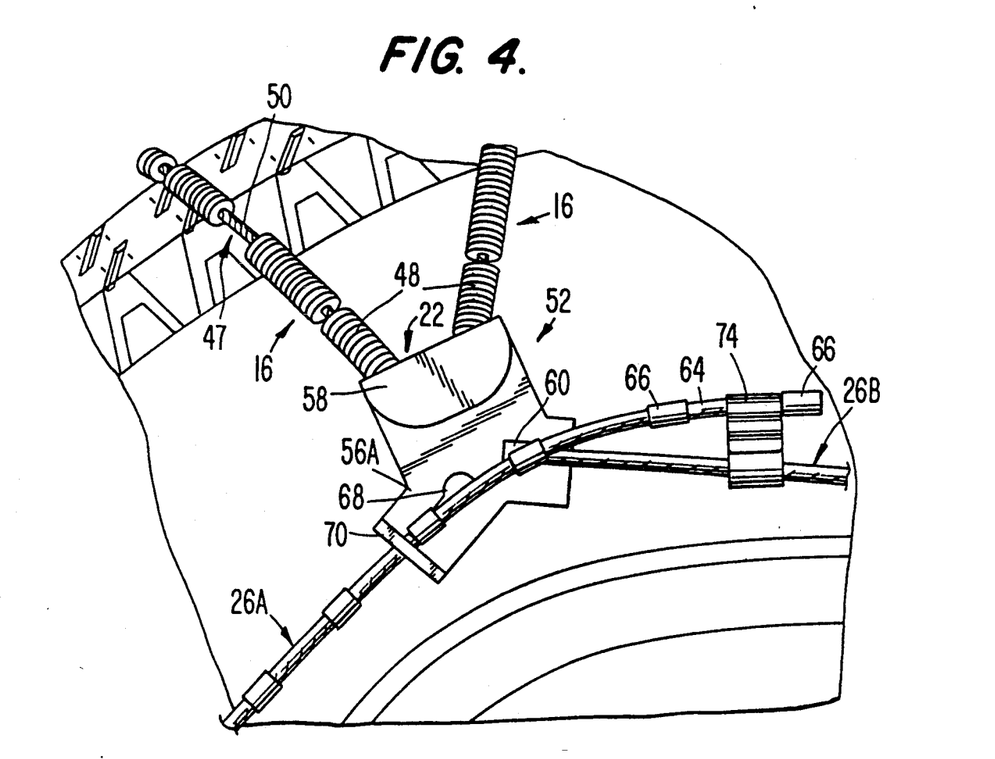
FIG. 4 is a fragmentary elevational view of the first embodiment, showing details of cross members, outer side cable segments, and a connector for connecting cross members to outer side cable segments and for releasably fastening an outer side cable segment.
Figure 5:
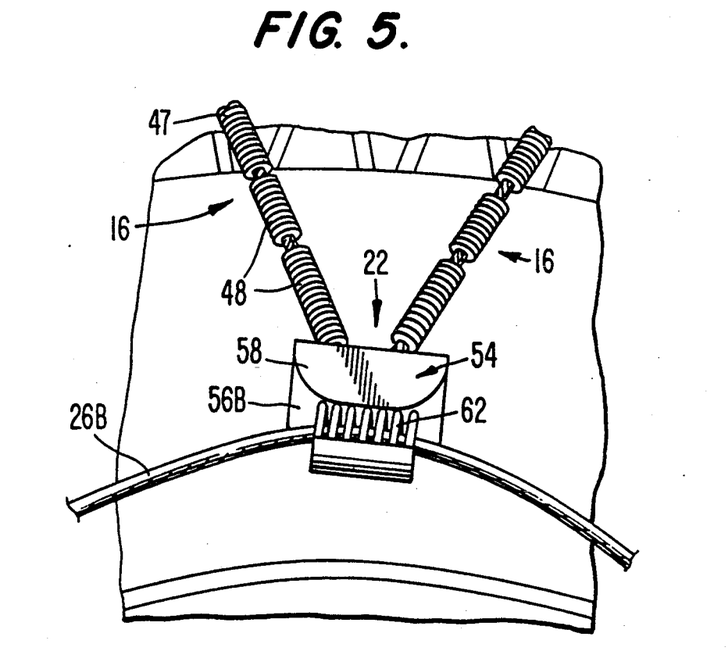
FIG. 5 is a similar elevational view illustrating details of cross members, a connector for the cross members, and an outer side cable segment slidable relative to the connector.

As is evident in FIGS. 4 and 5, the cross members 16 comprise cable sections 47 supporting traction elements in the form of rollers 48. The rollers are preferably coil springs. The cables of the cross members may be wrapped with helical wire 50. In some instances, the rollers may be deleted, traction being provided by the cables themselves, which may be wrapped with wire. Other types of traction elements may be used when appropriate.

As shown in FIG. 1, the outer vertices 22 of the tire chain are attached to additional connectors, which, in the embodiment illustrated are of two types. A first type 52 is shown in FIG. 4, and a second type 54 is shown in FIG. 5. Each type includes a plate 56A or 56B and a bent over tab 58. The ends of the each pair of successive cross members forming an outer vertex may be attached to one of the connectors in the manner described with reference to FIG. 3. By virtue of such attachment, the vertex angle at each of the connectors is adjustable, and replacement of cross members is facilitated as described in connection with connectors 24.

As shown in FIG. 1, the tensioning device 26 comprises three cable segments 26A, 26B, 26C associated with the outer vertices. In some instances, less than or more than three cable segments may be used (with a smaller or larger number of outer vertices). However, at least three cable segments are preferably used to achieve certain advantages of the invention which will be described later.

One end 60 of each cable segment is anchored to a connector 52, as shown in FIG. 4, as by crimping, welding, or any other appropriate attachment technique The cable segment then passes slidably through a succeeding connector 54, as shown in FIG. 5. For this purpose, the connector 54 may have a sleeve 62 through which the cable segment passes. In the form shown, the sleeve 62 is a coil spring, but the sleeve may be a nylon tube, for example.

A free end 64 of each cable segment has a series of spaced lugs or bushings 66 crimped or otherwise attached thereto. The lugs are adapted to be passed through a keyhole-shaped opening 68 in the plate 56A and to abut a flange 70 selectively, as shown in FIG. 4. By virtue of this arrangement, the effective length of each cable segment may be selected. U.S. Pat. No. 3,752,204 assigned to the same assignee as the present invention discloses a similar arrangement for selecting the effective length of a cable. It will be apparent from FIG. 4 that each connector to which a free end of a cable segment is releasably fastened is also a connector to which an end of a succeeding cable segment is anchored. If desired, the end 64 of each cable segment may have a stop thereon which keeps the cable end 64 trapped on the associated connector 52 while maintaining adjustability of the effective length of each cable segment.

Figure 9:
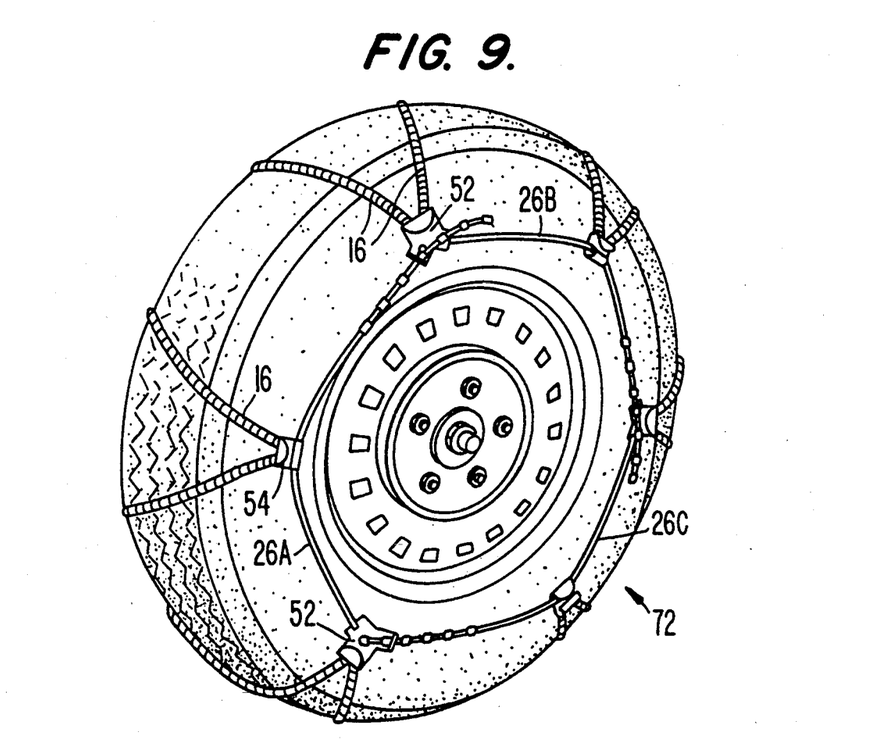
FIG. 9 is a perspective view illustrating the tire chain fully mounted.

When a tire chain of the invention is fully mounted on a wheel 72 as shown in FIG. 9, in a manner to be described, the cable segments are joined seriatim to form a substantially continuous outer side member 26A-26B-26C. Spring clips 74 (see FIG. 4) may be provided on each cable segment to receive the free end of the preceding cable segment that extends beyond the plate 56A. The inner side member forms a circle of predetermined circumference about the rim of the vehicle wheel at the inner side thereof. The cross members 16 extend back and forth across the tread of a tire 76 mounted on a rim 78 of the wheel, and the outer side member, coupled to the connectors 52 and 54 of the outer vertices 22, draws the outer vertices toward the rotational axis of the wheel and applies tension to the cross members.

Alternate outer vertices 22 are fixed in position upon the outer side member, by means of the connectors 52, and the intermediate outer vertices are slidable along the outer side member by virtue of the connectors 54. With this arrangement, each outer vertex is adjustable circumferentially relative to adjacent outer vertices, but because of the fact that alternate outer vertices are fixed in position on the outer side member, bunching of the vertices (and even stripping of the tire chain from the wheel) cannot occur, even under severe acceleration or braking.

Figure 6:
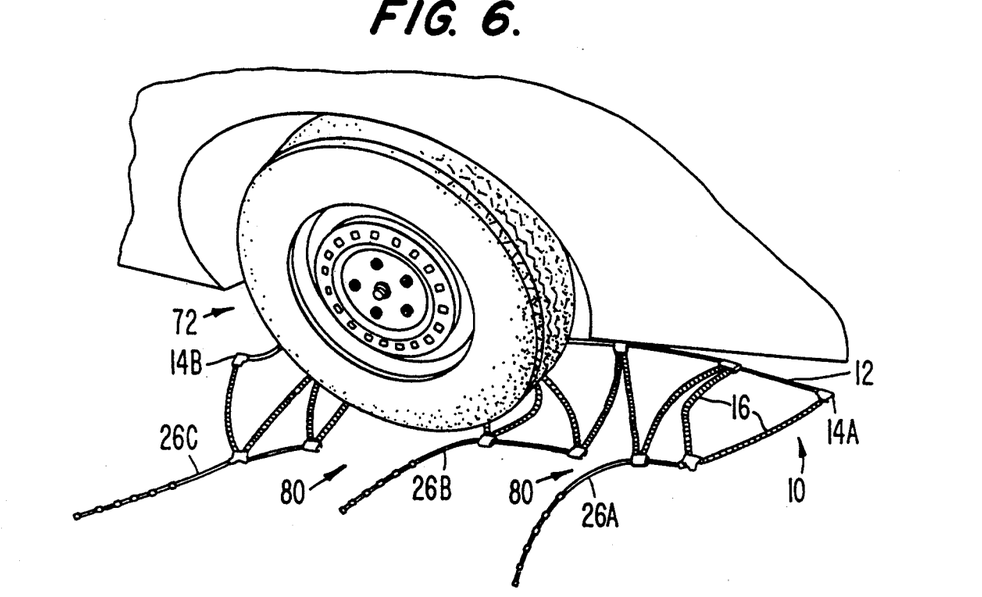
FIG. 6 is a perspective view illustrating a tire chain in accordance with the first embodiment of the invention about to be mounted on a wheel of a vehicle.
Figure 7:
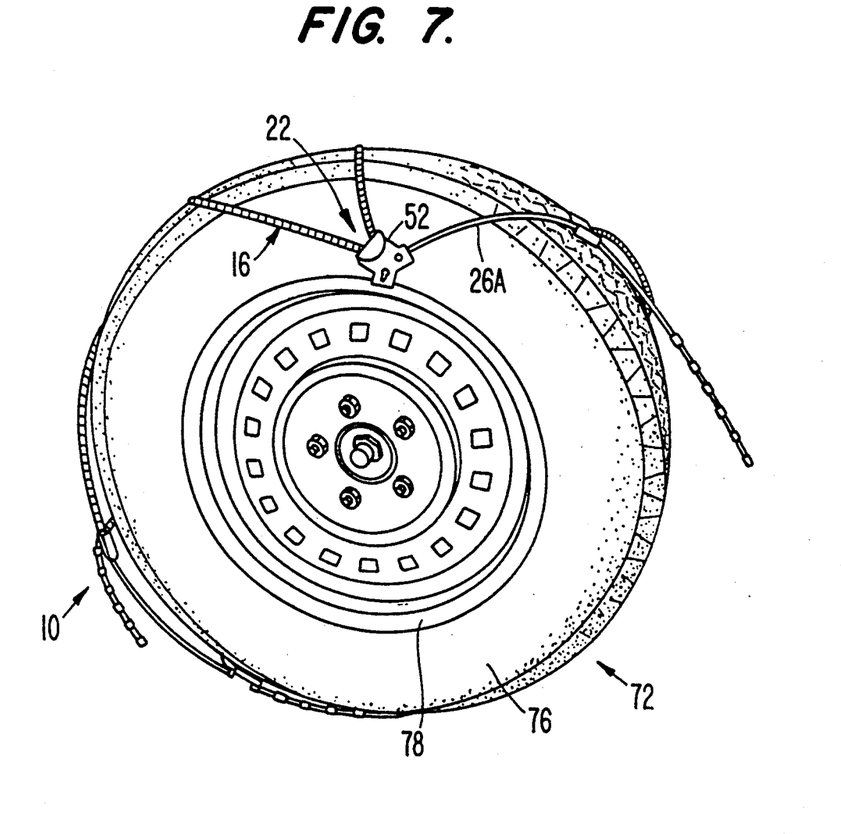
FIGS. 7 and 8 are elevational views illustrating different stages in the mounting of the tire chain.
Figure 8:
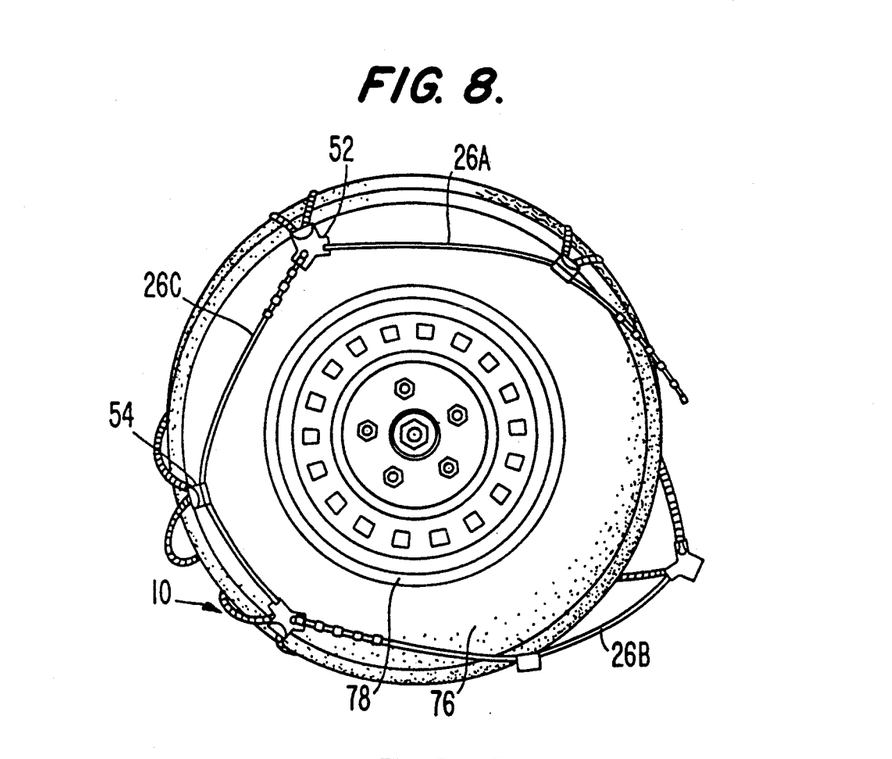

The preferred manner of mounting the tire chain on a wheel will now be described with reference to FIGS. 6-8.

The vehicle should be parked with the engine turned off and the emergency brake set. For front wheel drive vehicles, the steering wheel should be turned so that the front wheels are straight ahead. The chain should then be laid flat on the ground as shown in FIG. 6, with the smooth side of all connectors facing up (the smooth sides will ultimately face the tire sidewalls) and with the free ends of the three cable segments lying loose. The chain should then be slid on the ground so that one of the gaps 80 in the outer side member is aligned with the wheel. One cross member will lie ahead of the wheel and the preceding cross member will lie behind the wheel. These cross members should move freely. Opposite ends of the inner side member are then grasped and pulled upwardly to an accessible location, so that the fastener elements 14A and 14B may be joined.

After the inner side member is formed into a complete circle at the inner side of the wheel, the free ends 64 of the cable segments are fastened to the corresponding connectors 52 (see FIG. 4), one at a time, starting with the cable segment that is aligned with the wheel. At first the effective length of each cable segment is made rather long, but then the effective length of the cable segments is adjusted, proceeding clockwise around the wheel, for example, to fit the tire chain around the tire. It is sometimes necessary to grasp the cross members and to shuffle the chain to obtain the proper fit.

Hand tightening of the chain in this manner is preferably performed by advancing one bushing 66 at a time from fastener to fastener of the outer side member until the chain is considered hand tight. After the chain is considered to be hand tight, the vehicle may be moved as necessary for further chain tightening. When the adjustment is complete, the cable segments should be of approximately equal length. However, because of the conditions under which a chain is mounted, it may not be possible to obtain approximately equal length segments until the vehicle has been moved. Initially, it may be necessary to make one of the segments substantially longer than the others in order to fasten that segment to the corresponding connector 52. By virtue of the slidability of the segments at corresponding connectors 54, the initial fastening of the one segment may be achieved by, in effect, "borrowing" from one or more of the other segments, in which event the cross member pattern will be non-uniform initially. The ability to fasten the segments under such circumstances is a virtue of the invention. The cross member pattern will be made uniform when the vehicle is moved and the length of the cable segments is readjusted to make them approximately equal. Excess at the free ends of the cable segments is secured by the clips 74 (FIG. 4).

Instead of an inner side member formed of cable, the inner side member may be formed of a stiff (semirigid) spring wire hoop, for example. Such a hoop 82 is shown diagrammatically in FIG. 10, where the fastener elements at the end of the hoop are shown diagrammatically as a simple hook 84 and eye 86. Spacer sleeves 88 may be used to separate successive connectors of the inner vertices, in which event the sleeves of the inner vertices need not be crimped or otherwise fixed to the hoop In a further modification, the inner side member may be a link chain, and the inner vertices may be provided with appropriate connectors for attachment to the link chain.

Some observations regarding important features and advantages of the invention are now in order. The length of the inner side member is preferably non-adjustable, and the length of the inner side member fastener element is minimal. Thus, when the tire chain is mounted, the circle formed by the inner side member may be disposed at a predetermined distance from the rim, preferably within about two inches beyond the rim, independent of the tire size, and devoid of chord-like lengthy fasteners for the ends of the inner side member. Clearance problems at the inner side of the wheel, with respect to brake hardware, for example, are thus avoided or minimized. Furthermore, the use of a non-adjustable fastener for the inner side member simplifies and facilitates the mounting of the tire chain on a wheel.

At the inner side of the chain, the end cross members of the cross member pattern terminate close to the ends of the inner side member When the ends of the inner side member are connected, the cross members at the ends of the cross member pattern converge to form a vertex adjacent to the inner side member fastener elements, similar to the inner vertices formed by the remaining pairs of cross members. Thus, when the tire chain is mounted on a wheel, a substantially uniform cross member pattern is formed throughout the circumference of the tire. This eliminates a variable-length characteristic of prior tire chains of both ladder and diagonal configurations.

The spacing of the inner vertices along the length of the inner side member is fixed, so that when the tire chain is in use, the circumferential spacing of the inner vertices is fixed. This contributes significantly to maintaining the uniformity of the cross member pattern in use and simplifies mounting of the tire chain.

The fixing of the circumferential positions of three outer vertices at connectors 52 in the first embodiment contributes significantly to maintaining the uniformity of the cross member pattern, preventing bunching of cross members in hard braking or acceleration, and preventing the tire chain from being stripped from the wheel under severe acceleration or deceleration. Nevertheless, the spacing between successive outer vertices is self-adjusting in use by virtue of the sliding connectors 54. In the invention, all of the tensioning and adjustability of the tire chain is at the outside of the wheel, as is the "drape" of the cross members.

The cross members are arranged in pairs, so that there is an even number of cross members in the cross member pattern. By virtue of the hinging action at the vertex connectors, the tension in the cross members is self-adjusting individually. Forces exerted on the side members by the cross members are not applied directly, but rather through the intermediary of the vertex connectors. Circumferential force components applied to each connector by the associated pair of cross members are oppositely directed and tend to balance out.

By virtue of the connector arrangement between cross members and side members, problems of breakage at junctions between cross members and side members of prior tire chains are alleviated. Also, by virtue of the manner in which the ends of the inner side member are fastened and by virtue of the manner in which the cross members at the ends of the cross member pattern apply forces to the fastening elements of the inner side member, problems with breakage of the inner side member at the fastener region are alleviated.

The invention provides advantages that have not been possible in prior diagonal tire chains, and optimizes advantages that may have been possible in theory, but not in practice. The substantially uniform zig-zag diagonal pattern of the cross members in the tire chain of the invention ensures more uniformity of traction, because there will always be a cross member between the tire tread and the road. In prior diagonal tire chains, this is not possible, because of gaps in the cross member pattern that may be intrinsic to the pattern, or the result of a variable gap formed where the ends of side members are joined, or the result of circumferential shifting of the cross members.

In tire chains of the invention, the diagonality of the cross members is maintained throughout the cross member pattern. This prevents cross members from falling into and becoming trapped in transverse grooves of the tread pattern, which can be highly detrimental to the tire, as well as to the tire chain. With the diagonality of the cross members maintained, the chain runs more uniformly, with less vibration and noise and less throw-out of cross members. The reduced throw-out minimizes clearance problems in the wheel well and decreases cross member wear. The diagonal cross members feed smoothly under the tire as the wheel rotates.

Not only do tire chains of the invention provide better traction, they permit operation at greater speeds and provide greater tire chain endurance. Solid cylindrical roller traction elements on diagonal tire chains tend to wear in a "top hat" pattern, but it has been found that when coil spring rollers are used on diagonal cross members, this problem does not occur. Moreover, because the uniformity of the cross member pattern is maintained in use, wear that does occur tends to occur more uniformly across the entire pattern of the cross members, rather than acutely at particular points in the cross member pattern, so longevity of the tire chain is increased. This effect is enhanced by the manner in which the individual cross members are tensioned and adjusted, which equalizes throw-out. Superior dynamic balance is achieved, which contributes to increased endurance, a smoother ride, and less tire damage. Reduced tire damage is also due to other features of the invention and is an important advantage of the invention.

Overtight mounting of prior tire chains is a significant cause of tire damage. However, if the tire chain is mounted too loosely, cross members may strike vehicle parts and damage the vehicle as well as the tire chain. The tire chains of the invention are easily mounted with the desired degree of rotational freedom on a wide variety of tire types, but even if a tire chain of the invention is mounted tightly, tire damage is not a significant problem.

The tire chains of the invention are "streamlined" and work very well with a wide variety of tire types, including low profile and other modern tires.

As is evident from the foregoing discussion, tire chains of the invention are highly advantageous to the user. They are also highly advantageous to the manufacturer and to the seller. A given stock number of a tire chain of the invention will properly fit more tire sizes than any comparable prior tire chain. Furthermore, one inner side member length may fit two, or even three rim sizes, without regard for the tire size. Thus, three inner side member lengths may fit a total of seven rim diameters, for example. The width or diameter of the tire will dictate the length of the cross members, but since the drape of the cross members on the sidewall and the tensioning of the cross members occur on the outside of the tire, there is substantial latitude in the choice of cross member length.

For a given inner side member length and a given rim diameter, the cross member length may be selected to ensure adequate drape at the outer sidewall for various tire sizes. There may, for example, be two or three cross member lengths for each inner side member length. The net result of this is that it may be possible to fit all passenger car tires with only eight different tire chain stock numbers. This is a considerable advantage to the seller (particularly in terms of inventory requirements) as well as to the manufacturer.

One of the advantages of the first embodiment is that the side members as well as the cross members are formed of cable. For example, the side members may be $\frac{1}{8}$- 7×7 cable, and the cross members may be $\frac{1}{8}$- 7×19 cable. The cable may be coated (vinyl or nylon, for example) or may be uncoated. Cross cables may be wrapped with helical wire, as indicated earlier, although this tends to increase the weight as well as the momentum of the cross members. In general, a cable-type tire chain tends to be a light weight tire chain that is easily packaged and easily handled.

Further embodiments of the invention, having most, if not all of the advantages of the first embodiment, will now be described. Except where otherwise stated, the construction of each of the further embodiments (in particular, the inner side member, the cross members, the inner vertex connectors, and the traction elements) is assumed to be the same as in the first embodiment.

Figure 11:
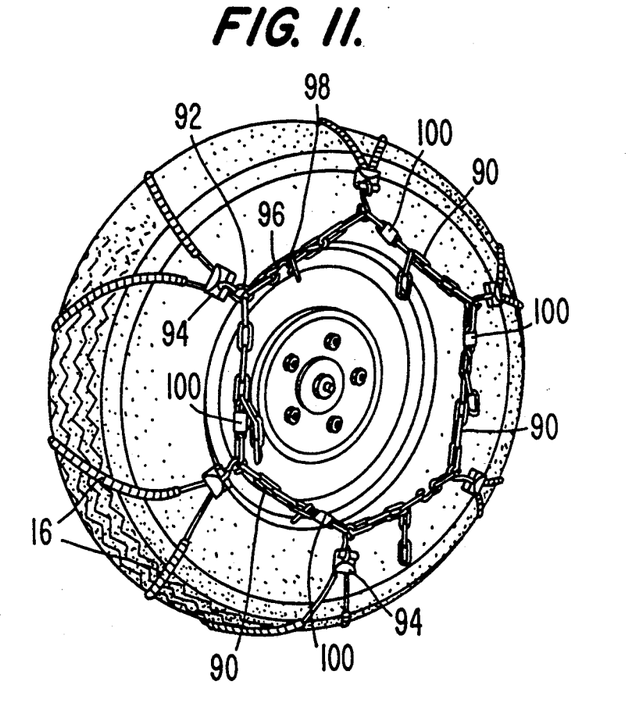
FIG. 11 is a perspective view illustrating a tire chain in accordance with a second embodiment of the invention, the tire chain being shown mounted on a wheel of a vehicle.

In a second embodiment of the invention, shown in FIG. 11, an outer side member is formed of adjustable-length segments 90 of link chain. Each segment has opposite ends attached to closed hooks or rings 92 pivotally supported on outer vertex connectors 94. One of the links of each segment has a hook 96 that may be engaged with any one of a number of links 98 of that segment to adjust the segment length. A small elastic sleeve 100 may be slipped over the hook 96 to prevent its disengagement from the engaged link 98. When the length of each of the segments 90 is properly adjusted, the segments form an outer side member that draws the connectors 94 toward the rotational axis of the wheel and applies tension to the cross members 16.

Figure 12:
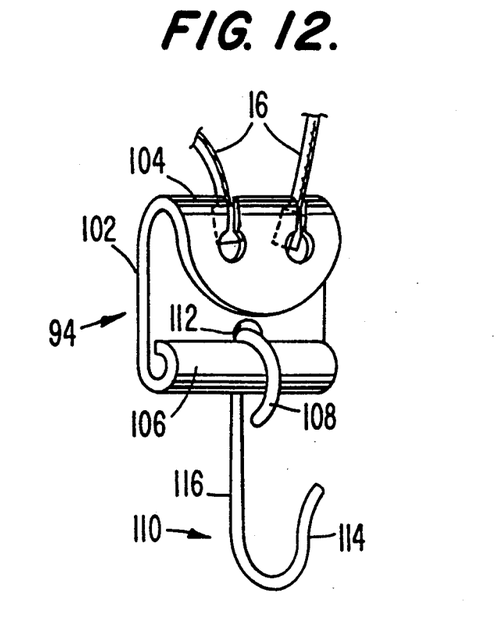
FIG. 12 is a fragmentary perspective view showing a modified connector that may be used to connect cross members to an outer side member.

As shown in FIG. 12, each of the outer vertex connectors 94 employed in FIG. 11 may comprise a plate 102 with a bent over tab 104 and a sleeve 106 similar to the construction shown in FIG. 3, but the sleeve forms a bearing surface for the eye 108 of a hook 110 that passes through an opening 112 in the plate 102 with sufficient freedom to permit the hook to pivot and assume different angles. When the connectors 94 shown in FIG. 12 are employed in the embodiment of FIG. 11, the salient portion 114 of the hook is closed upon the shank 116 to form a ring that captures end links of the link chain segments.

Figure 13:
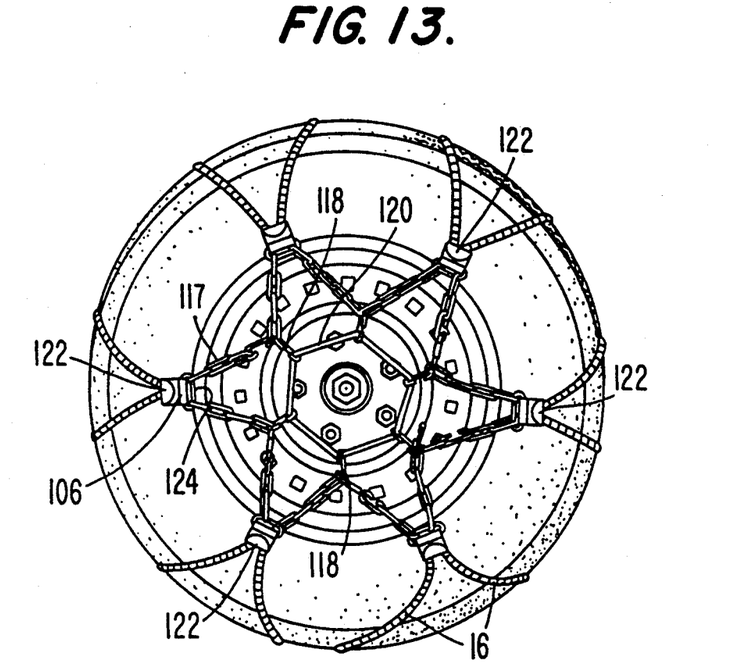
FIG. 13 is a view similar to FIG. 11, but showing a modification of the second embodiment.

FIG. 13 shows a modification of the second embodiment. In the modification, instead of adjusting the length of the link chain segments, a central link of each segment 117 is provided with a hook 118 that engages an elongated continuous elastic member 120. Thus, tension is applied to the link chain segments and is in turn applied to the cross members 16 via the outer vertex connectors 122. The connectors 122 shown in FIG. 13 are a modified type in which a ring 124 is looped through the sleeve 106 and adjacent end links of successive link chain segments 117 are coupled to the ring.

Figure 14:
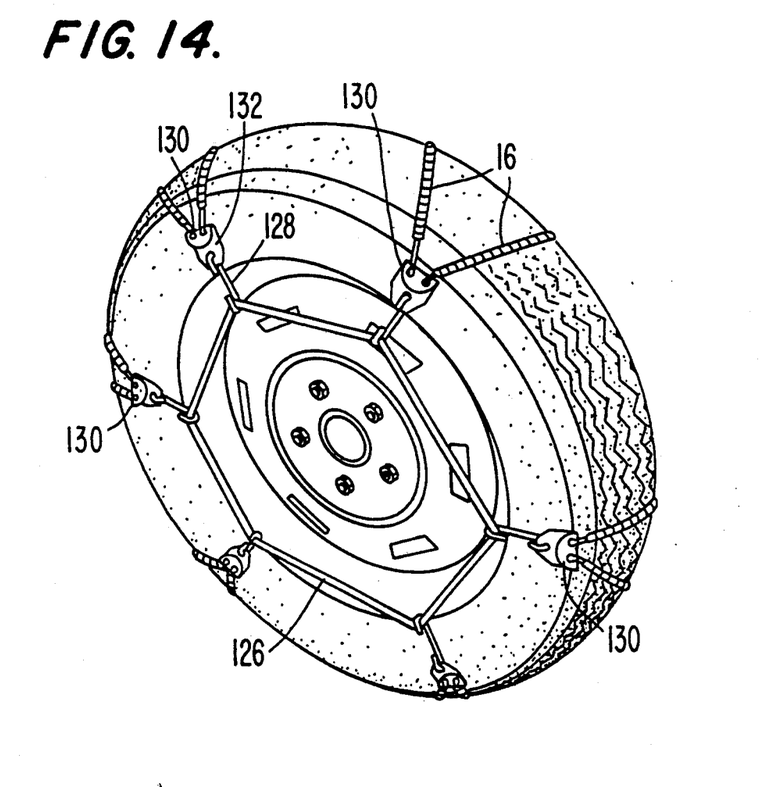
FIG. 14 is a view similar to FIG. 11, but showing a third embodiment of the invention.

FIG. 14 shows a third embodiment of the invention, in which tension is applied to the cross members by an elongated continuous elastic member 126 engaging hooks 128 of outer vertex connectors 130. In the form of connector shown in FIG. 14, the sleeve 106 of each outer vertex connector shown in FIG. 12 has been eliminated, although such a sleeve may, of course, be employed. Moreover, instead of employing separate hooks 128, the plate 132 of each outer vertex connector 130 may have an integral flat hook to engage the elastic member.

Figure 15:
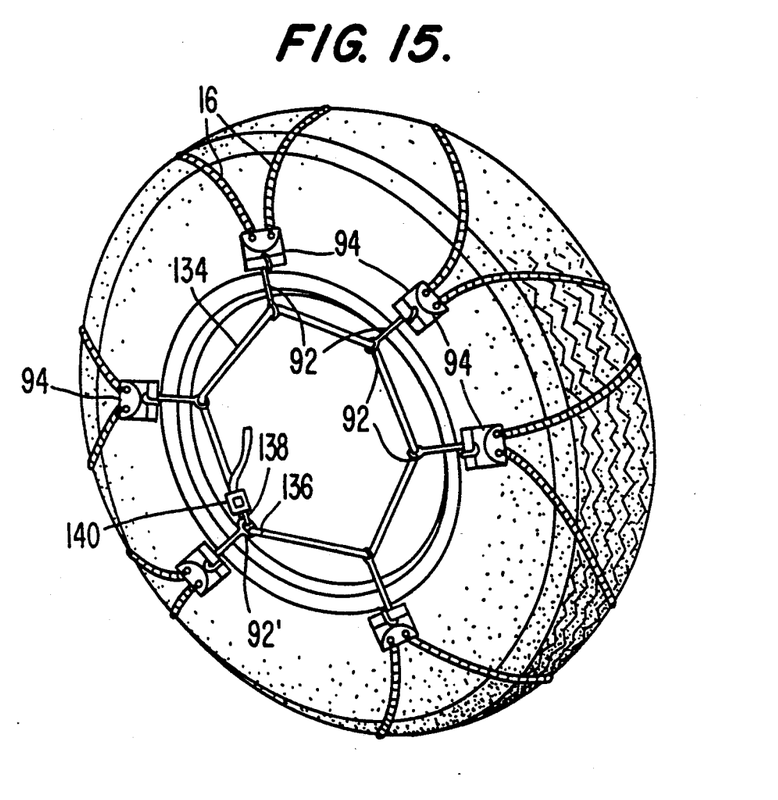
FIG. 15 is a view similar to FIG. 11, but showing a fourth embodiment of the invention.

In a fourth embodiment, shown in FIG. 15, the elastic member 126 has been replaced by an adjustable length of webbing 134 threaded through the closed hooks or rings 92 of the outer vertex connectors 94 of FIG. 11. One end of the webbing may have an integral loop 136 engaging a master ring 92' of one of the outer vertex connectors. The plane of ring 92' is perpendicular to the plane of rings 92. Ring 92' may also engage a hook 138 of a buckle 140 through which a free end of the webbing is looped back upon itself adjustably. Such buckles are well known. It is evident that an outer side member may be formed partially of elastic material and partially of webbing, if desired.

Outer vertex connectors of the type shown in FIG. 12, for example, in which a hook is pivotally connected to the plate of the connector, are advantageous in permitting self-tightening of associated cross members to take up slack that may be created when the tire is rotating. Such outer vertex connectors are especially desirable when the tensioning device comprises an elastic member, because stretching of such an elastic member contributes to slack production in certain cross members. More particularly, as the tire chain rotates on the tire, cross members having their forward end connected to the inner side member (as viewed with reference to the top of the tire tread) tend to bow rearwardly. This tendency is aggravated by the tendency of traction rollers on such cross members to migrate toward the forward end of the cross members.

To counteract unwanted cross member slack that may be generated during tire rotation, it is desirable that the outer vertex connectors be capable of pivoting relative to their hooks. In other words, it is desirable that the outer vertex connectors respond to the relative tension in the associated cross members by pivoting relative to their hooks. For the most desirable pivoting and slack take-up, the triangle defined by the pivot point of the hook on each outer vertex connector and the points at which the associated cross cables engage the connector is preferably an equilateral triangle, which provides a pivot range of about 30°. If the pivot point is moved closer to the rotational axis of the wheel, an isosceles triangle will be defined, providing a smaller pivot range, which may nevertheless be satisfactory in some circumstances.

Figure 16:
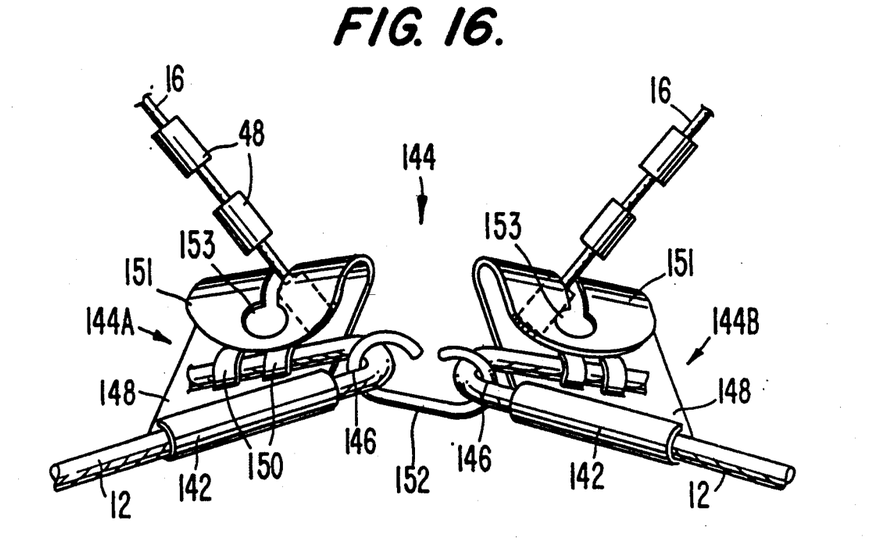
FIG. 16 is a fragmentary perspective view showing a modified inner side cable fastener.

FIG. 16 illustrates a fastener 144 that is a modification of the inner side member fastener 14 shown in FIG. 2. In the modification, the fastener 144 comprises a pair of fastener elements 144A, 144B, each of which includes a plate 148 having a portion curved from one extremity of a body portion of the plate to form a sleeve 142 at one side of the plate. An associated end portion of the side cable 12 passes through the sleeve 142 and is then turned back to form a loop 146. The sleeve 142 is crimped to the cable so as to grip the side cable end portion passing therethrough. The extremity of the side cable end portion is attached to the plate 148 by means of bridges 150 punched from the plate at the same side of the plate as the sleeve 142 and crimped over the extremity of the side cable end portion, as shown. A tab 151 is bent over from an extremity of the body portion of the plate opposite to the sleeve 142 and at the same side of the plate as the sleeve. The tab has an opening 153 through which an associated end portion of a cross member 16 extends. The cross cable end portion has a lug, such as the lug 44 of FIG. 3, that is trapped between the tab 151 and the body portion of the plate 148. A hook 152 has opposite ends engaged with the corresponding loops 146 of the fastener elements (one end of the hook being a closed eye) so as to complete the circle of the inner side member. The fastener shown in FIG. 16 has very high pull strength and has reduced abrasion of the hook (cable being less abrading than sheet metal). For further reduction of abrasion, the cable loops may be provided with nylon sleeves or may be embraced by molded nylon members that engage the hook 152. The fastener shown in FIG. 16 is also advantageous in that all of the tension vectors (vectors applied to the parts of the fasteners) lie in approximately the same plane and intersect at approximately a common point, thus establishing a highly stable fastening system.

Figure 10:
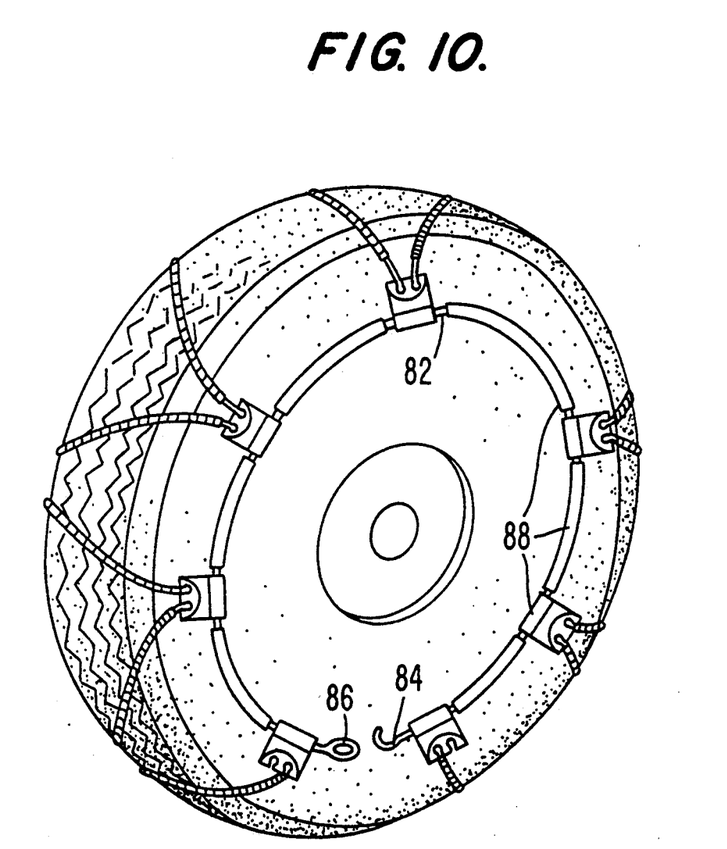
FIG. 10 is a perspective view illustrating a modification of the inner side member.
Figure 17:
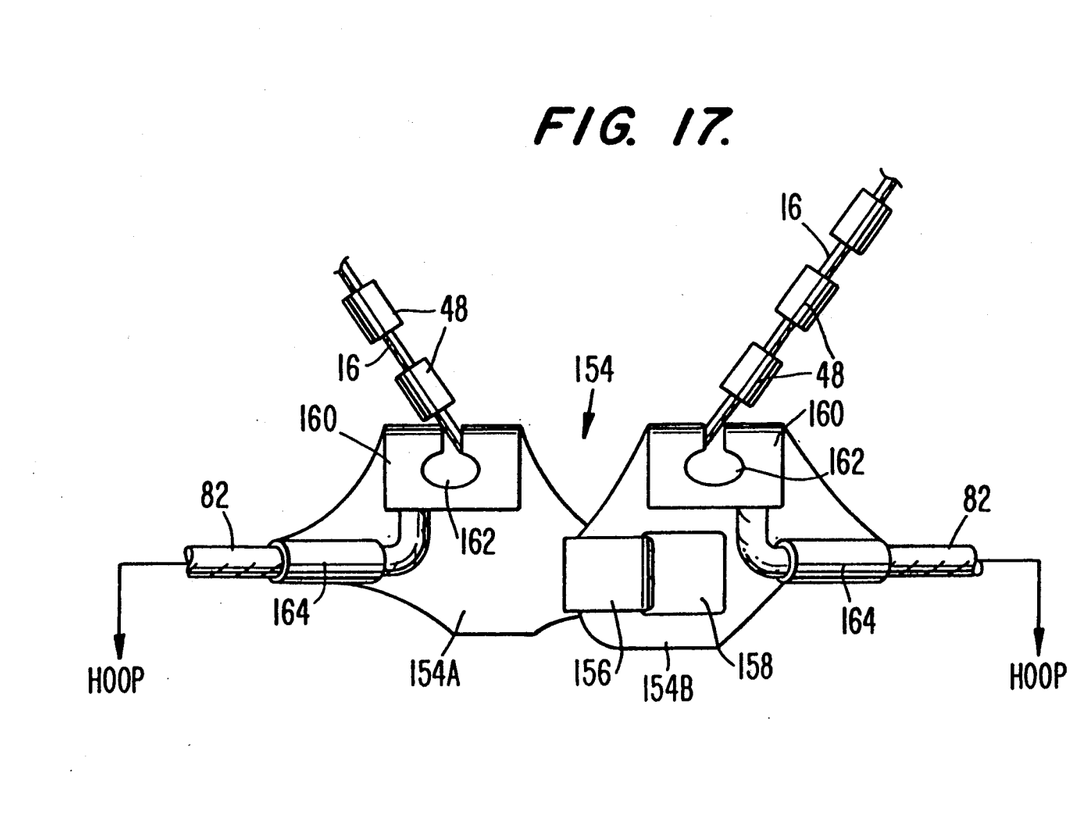
FIG. 17 is a fragmentary elevational view showing an inner side cable fastener suitable for use with the modification of FIG. 10.

FIG. 17 shows a fastener 154 suitable for use with the spring wire hoop inner side member 82 of FIG. 10. Fastener 154 comprises a pair of fastener elements 154A and 154B associated with respective ends of the wire hoop 82. Fastener element 154A has a flat hook 156 that is inserted in an opening 158 to complete the circle of the hoop 82. Bent over tabs 160 having keyhole-shaped openings 162 are used to secure the ends of cross members 16 as in FIG. 16, for example. Each fastener element has a sleeve 164 through which a corresponding end portion of the hoop passes. The extremity of each end portion is angulated relative to the remainder of the end portion and is re-directed under the associated tab 160. Each end portion is secured to its fastener element by the grip of the tab 160 and the sleeve 164, which may be supplemented as deemed desirable or necessary. By virtue of the fastener shown in FIG. 17, all the tension vectors lie in approximately the same plane and intersect at approximately a common point. In addition, the fastener is restrained against rotation out of the plane of the hoop.

While preferred embodiments of the invention have been shown and described, it will be apparent to those skilled in the art that changes can be made in these embodiments without departing from the principles and spirit of the invention, the scope of which is defined in the appended claims. For example, some of the features of the invention may be used advantageously in other types of tire chains, such as tire chains having link-type cross members.

The invention claimed is:

1. In a tire chain having a pair of side cable end portions to be interconnected and having a plurality of cross cables bearing traction elements, a fastener comprising a pair of fastener elements associated with said side cable end portions, respectively, each fastener element comprising a plate having a portion curved from one extremity of a body portion of the plate to form a sleeve at one side of the plate, the associated side cable end portion passing through the sleeve and then being turned back to form a loop, the sleeve gripping the side cable end portion, and the side cable end portion having an extremity that is attached to the end plate, the plate also having means for securing an associated cross cable end portion thereto; and means for interconnecting said loops.

2. A tire chain in accordance with claim 1, wherein said means for interconnecting said loops comprises a hook having one end engaging one of said loops and an opposite end engaging the other of said loops.

3. A tire chain in accordance with claim 1, wherein said cross cable end portion securing means includes an opening through the plate through which the cross cable end portion extends and a tab bent over from an extremity of the body portion of the plate opposite to the sleeve and at the same side of the plate as the sleeve, the cross cable end portion having a lug trapped between the tab and the body of the plate.

4. A tire chain in accordance with claim 1, wherein the extremity of the side cable end portion is attached to the plate by means of bridges extending from the body portion of the plate at the same side of the plate as the sleeve and crimped over the extremity of the side cable end portion.

* * * * *